Dec. 29, 1931. H. R. MOULTON ET AL 1,838,781
GLASS TREATMENT
Filed March 17, 1930
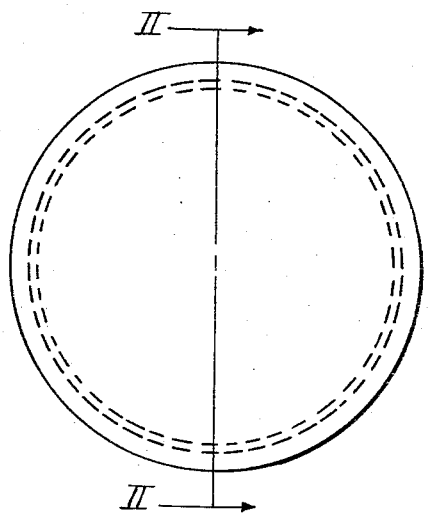
Fig. I
Fig. II
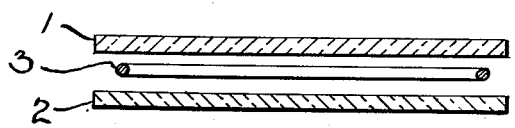
Fig. III
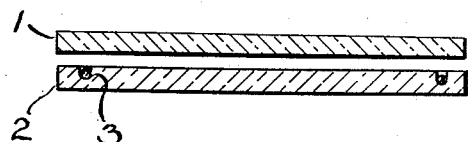
Fig. IV
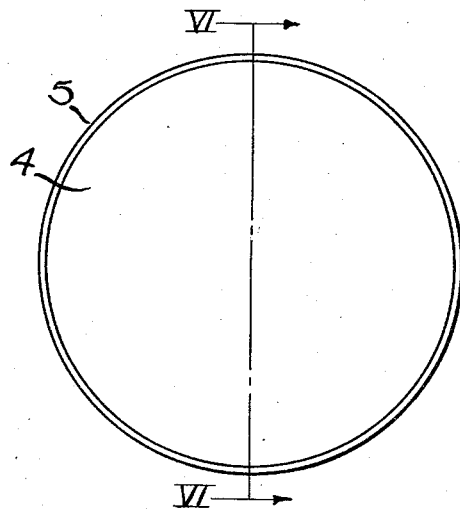
Fig. V
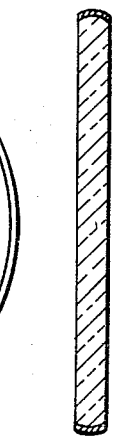
Fig. VI
Harold R. Moulton & Edgar D. Tillyer
INVENTORS
BY Harry H. Styll
ATTORNEY Patented Dec. 29, 1931

1,838,781

UNITED STATES PATENT OFFICE

HAROLD R. MOULTON, OF STURBRIDGE, AND EDGAR D. TILLYER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

GLASS TREATMENT

Application filed March 17, 1930. Serial No. 436,458.

This invention relates to improvements in glass treatment and has particular reference to the process of producing strengthened glass and to the product of said process.

The principal object of this invention is to provide a strengthened glass made by the simple process of placing the same in compression.

Another object of this invention is to provide means whereby articles requiring a high surface finish and good definition of image such as lenses, may be finished after strengthening without in any way detracting from their strength.

Another object of this invention is to provide a strengthened glass which will not fly to pieces when broken.

Another object of this invention is to provide means whereby strengthened glass may be made in any size or thickness without increasing the number of steps for producing such glass.

Other objects and advantages will become apparent from the following description taken in connection with the accompanying drawings, and it will be apparent that many changes may be made in the details of construction, arrangement of parts and steps in the process without departing from the spirit of the invention as expressed in the accompanying claims. We, therefore, do not wish to be limited to the exact details shown and described as the preferred forms only have been shown by way of illustration.

In the drawings;

Fig. I is a front view of one form of the invention.

Fig. II is a section taken on line II—II of Fig. I.

Fig. III is a sectional view similar to Fig. II but showing the parts separated.

Fig. IV is a sectional view similar to Fig. III but showing a modification.

Fig. V is a front view of a modified form of the invention.

Fig. VI is a section taken on line VI—VI of Fig. V.

In the process of strengthening glass it is well known that if the glass is placed in a state of compression, it will offer greater resistance to sudden heating or cooling or mechanical shocks than one under tension or without compression. In the past, this has been done by uniting layers of glass of different coefficients of expansion. In this method the glass having the higher coefficient of expansion would shrink upon cooling more than the layer having the lower coefficient of expansion, so that one layer would be in tension and the other in compression. This method, of course, necessitated the choice of glasses having suitable coefficients of expansion, and the ultimate result was always more or less uncertain. In our invention, we have provided means whereby the coefficient of expansion and other restricting factors may be ignored, and the widest possible choice of glasses to be used is provided.

Our invention is particularly adapted for strengthening glass which is to be used between the eye and an object, or for the projection of images, or for any other use necessitating clear visual qualities in the glass. This is made possible by the simple process involved, which does not, in any way, destroy definition or cause bubbles, striæ, or other defects in the finished glass.

Referring to the drawings wherein similar characters of reference denote corresponding parts throughout the several views, we have shown in Fig. III two layers of glass, 1 and 2, between which is placed a ring 3 preferably of metal.

The layers of glass 1 and 2 may be the same as regards their physical characteristics. The only requirement of this process is that the ring 3 has a higher coefficient of expansion than the glass, in order that it will contract more than the glass, and so introduce a compressive strain. The two layers of glass 1 and 2 with the ring 3 between them may be placed upon a refractory block and heated until the glass layers 1 and 2 are softened sufficiently for the ring to become embedded therein. As shown in Figs. I and II the glass will then be in the form of a single plate with the ring 3 embedded therein.

From the foregoing description it will readily be seen that as the contraction of the metal ring 3 is greater than that of the glass, that a compressive strain will be introduced as soon as the united parts have cooled. Any blow received upon the glass will be withstood far better than if it were not under compression, due to the contraction of the metal ring 3.

If the strengthened glass is to be used for lenses, windshields, or other articles where strength to resist shock must be combined with good visual qualities, the strengthened glass may be cut to desired shape, surfaced to any curvature, and polished to any degree required.

As the layers 1 and 2 are made of the same kind of glass there will be no difficulty in fusing if this method is chosen for uniting them, and the finished product will be free from any of the waves, irregularities, or defects associated with the union of glasses having different physical characteristics.

As a modified form of the process we can first heat the ring 3 and then embed it in one of the layers of glass, and if desired fusing the second layer thereover, as shown in Fig. IV. The results from this process will, of course, be identical with those obtained from the process first described.

We have found that a suitable combination to employ in this process is a glass having a coefficient of expansion of $0.09 \times 10^{-4}$ and a steel wire having a coefficient of expansion of $0.13 \times 10^{-4}$. This combination is, of course, one of the many that may be used, and as previously stated, the only requirement is that the contraction of the metal ring 3 should be greater than that of the glass.

In a further modification of our invention and employing the compressive characteristics of steel and glass having different coefficients of expansion, we have shown in Fig. V a glass plate 4 having a metal ring around its periphery. In forming this modification we first make the glass plate with slightly rounded edges, as shown in Fig. VI, and having heated the metal ring 5, we place it thereover and allow it to shrink upon the glass plate 4. As the metal ring shrinks upon the glass plate 4, it will thereby place the said glass under compression, and provide a strengthened glass in much the same way as it was obtained by the foregoing process. We have found that by rounding the edge of the glass plate shown in Fig. VI there is less tendency for the metal ring to slip off when cooled.

The application of this improved strengthened glass is very wide, as will be apparent. It will be of particular value in the manufacture of goggle lenses where clear visual characteristics must be combined with protective qualities of the glass used therefor. By utilizing a glass made by our improved process, there will be no fear of the glass flying into fragments upon receiving a blow or being struck by a flying missile. The extreme simplicity of the process which will be clear from the foregoing description will permit this glass to be made cheaply and economically in large quantities. This feature, combined with the adequate protection and clear visual characteristics provided thereby, makes this invention of particular merit, inasmuch as much time and material have heretofore been devoted to producing an inadequate and poor product by prior art methods, such as those described herein.

Having described our invention, we claim:

1. The process of making strengthened glass comprising placing between layers of glass a material having a higher coefficient of expansion, uniting said glass layers and material by heat and cooling normally to place the glass under compression by contraction of the material thereon.

2. The process of making strengthened glass comprising placing between layers of glass a metallic ring having a higher coefficient of expansion, uniting said glass and ring by heat and cooling to place the glass under compression by contraction of the ring thereon.

3. As a new article of manufacture, a glass plate having a metallic ring secured therein by heat, said metallic ring having a higher coefficient of expansion than said glass and introducing a compressive strain in said glass upon cooling after said securing by heat due to the greater contraction of said ring.

4. As a new article of manufacture, a glass plate having a member of material having a higher coefficient of expansion than the glass secured in the glass by heat said member introducing a compressive strain in the glass upon cooling after the said securing by heat due to the greater contraction of said member.

HAROLD R. MOULTON.
EDGAR D. TILLYER.